United States Patent
Alarawi et al.

(10) Patent No.: US 11,739,259 B1
(45) Date of Patent: Aug. 29, 2023

(54) INTERFACIAL ASSEMBLY OF INTEGRATED SILICA NANOPARTICLES AND FLUOROSURFACTANT HETEROSTRUCTURES IN FOAMED FRACTURING FLUIDS

(71) Applicant: SAUDI ARABIAN OIL COMPANY, Dhahran (SA)

(72) Inventors: Abeer Ateeq Alarawi, Al Khobar (SA); Abdullah Al Moajil, Dammam (SA); Abdullah Alrustum, Al-Taraf (SA); Waddah Al Mahri, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/658,275

(22) Filed: Apr. 7, 2022

(51) Int. Cl.
*E21B 43/27* (2006.01)
*C09K 8/70* (2006.01)
(Continued)

(52) U.S. Cl.
CPC .............. *C09K 8/703* (2013.01); *C09K 8/602* (2013.01); *C09K 8/665* (2013.01); *C09K 8/68* (2013.01);
(Continued)

(58) Field of Classification Search
CPC ...... C09K 8/703; C09K 8/6025; C09K 8/665; C09K 8/725; C09K 2208/10; E21B 43/27; E21B 43/267
See application file for complete search history.

(56) References Cited

U.S. PATENT DOCUMENTS

| 7,033,975 B2 | 4/2006 | Baran, Jr. et al. |
| 8,278,252 B2 | 10/2012 | Crews et al. |

(Continued)

FOREIGN PATENT DOCUMENTS

| CN | 110540833 A | 12/2019 |
| CN | 111927385 A | 11/2020 |

(Continued)

OTHER PUBLICATIONS

Alsaba, Mortadha T., et al., "A comprehensive review of nanoparticles applications in the oil and gas industry", Journal of Petroleum Exploration and Production Technology, Springer, Jan. 2020 (11 pages).

(Continued)

*Primary Examiner* — Silvana C Runyan
(74) *Attorney, Agent, or Firm* — Osha Bergman Watanabe & Burton LLP

(57) ABSTRACT

A method of stimulating a hydrocarbon-bearing formation may include generating a foamed fracturing fluid having a half-life of 160 to 300 min at 77° F. The foamed fracturing fluid may comprise a fluorosurfactant, a nanoparticle, and a gas phase. The method may then include introducing the foamed fracturing fluid into a hydrocarbon-bearing formation under a pressure greater than the fracturing pressure of the hydrocarbon-bearing formation to generate fractures in the hydrocarbon-bearing formation. Another method of stimulating a hydrocarbon-bearing formation may include introducing a foaming composition into the hydrocarbon-bearing formation under a pressure greater than fracturing pressure of the hydrocarbon-bearing formation to generate fractures in the hydrocarbon-bearing formation. The foaming composition may include a fluorosurfactant, a nanoparticle, and a gas phase. The method then may include generating a foam from the foaming composition inside the (Continued)

hydrocarbon-bearing formation. The foam may have a half-life of 160 to 300 min at 77° F.

15 Claims, 3 Drawing Sheets

(51) Int. Cl.
   *C09K 8/66* (2006.01)
   *C09K 8/68* (2006.01)
   *C09K 8/60* (2006.01)
   *C09K 8/72* (2006.01)
   *E21B 43/267* (2006.01)
   *C09K 8/80* (2006.01)

(52) U.S. Cl.
   CPC .............. *C09K 8/725* (2013.01); *C09K 8/80* (2013.01); *E21B 43/267* (2013.01); *E21B 43/27* (2020.05); *C09K 2208/10* (2013.01)

(56) References Cited

U.S. PATENT DOCUMENTS

| | | | |
|---|---|---|---|
| 10,787,603 B2 | 9/2020 | Haghighi et al. | |
| 10,934,467 B2 | 3/2021 | Lv et al. | |
| 11,028,316 B2 | 6/2021 | Aslam et al. | |
| 2007/0044965 A1* | 3/2007 | Middaugh | C09K 8/703 507/213 |
| 2011/0136704 A1* | 6/2011 | Sharma | C09K 8/885 507/205 |
| 2012/0053252 A1* | 3/2012 | Ober | C08G 18/7831 507/131 |
| 2012/0132421 A1 | 5/2012 | Loiseau et al. | |
| 2012/0322700 A1 | 12/2012 | Crews et al. | |
| 2013/0264061 A1* | 10/2013 | Baran, Jr. | C09K 8/68 166/305.1 |
| 2016/0017204 A1 | 1/2016 | Hill et al. | |
| 2017/0198207 A1 | 7/2017 | Li et al. | |
| 2019/0010383 A1* | 1/2019 | Karadkar | C09K 8/68 |
| 2020/0024505 A1 | 1/2020 | Sayed et al. | |
| 2021/0207021 A1* | 7/2021 | Khamatnurova | C09K 8/845 |

FOREIGN PATENT DOCUMENTS

| | | |
|---|---|---|
| EP | 2855652 B1 | 10/2018 |
| WO | 2021126303 A1 | 6/2021 |

OTHER PUBLICATIONS

"Bindzil CC in waterborne coating applications: Silane modified colloidal silica—uses and benefits", Product Brochure, AkzoNobel, 2011 (8 pages).

Hatchman, Kevan, et al., "Exploiting Surfactant Synergies in the Development of Foamers for Gas Well Deliquification", Chemistry in the Oil Industry XII, Royal Society of Chemistry, Nov. 2011, pp. 83-111 (29 pages).

Lv, Qichao, et al., "Study of Nanoparticle-Surfactant-Stabilized Foam as a Fracturing Fluid", Industrial & Engineering Chemistry Research, ACS Publications, vol. 54, No. 38, Sep. 2015, pp. 9468-9477 (10 pages).

Smits, Joeri, et al., "Reversible Adsorption of Nanoparticles at Surfactant-Laden Liquid-Liquid Interfaces", Langmuir, ACS Publications, vol. 35, Aug. 2019, pp. 11089-11098 (10 pages).

Wang, G., et al., "Advances of Researches on Improving the Stability of Foams by Nanoparticles", IOP Conf. Series: Materials Science and Engineering, IOP Publishing, vol. 242, No. 012020, 2017, pp. 1-5 (5 pages).

Wu, Yining, et al., "The Stability Mechanism of Nitrogen Foam in Porous Media with Silica Nanoparticles Modified by Cationic Surfactants", Langmuir, ACS Publications, Jun. 2018, pp. 1-45 (46 pages).

Zhou, Yanxia, et al., "Surfactant-Augmented Functional Silica Nanoparticle Based Nanofluid for Enhanced Oil Recovery at High Temperature and Salinity", Applied Materials & Interfaces, ACS Publications, vol. 11, Nov. 2019, pp. 45763-45775 (13 pages).

U.S. Office Action issued in Corresponding U.S. Appl. No. 17/658,278, dated Feb. 23, 2023, 21 pages.

* cited by examiner

INTERFACIAL ASSEMBLY OF INTEGRATED SILICA NANOPARTICLES AND FLUOROSURFACTANT HETEROSTRUCTURES IN FOAMED FRACTURING FLUIDS

BACKGROUND

Well stimulation enables the improved extraction of hydrocarbon reserves that conventional recovery processes, such as gas or water displacement, cannot access. One well stimulation technique that is widely employed is hydraulic fracturing, which involves the injection of a fluid into a formation at a pressure that is greater than the fracture pressure. This increases the size and extent of existing fractures within the formation and may create new fractures.

Hydraulic fracturing is used in the oil and gas industry to stimulate production in hydrocarbon-containing formations. It is an oil field production technique that involves injecting a pressurized fluid to artificially fracture subsurface formations. The fracturing is created after drilling a well by injecting suitable fluids such as water or chemicals into the well under pressure to induce fractures in a formation. For example, pressurized hydraulic fracturing fluids may be pumped into a subsurface formation to be treated, causing fractures to open in the subsurface formation. The fractures may extend away from the wellbore according to the natural stresses within the formation.

Hydraulic fractures may be generated in the hydrocarbon reservoir by pumping fluid, often primarily water, from a hydraulic fracturing unit on the surface through the wellhead and the wellbore. When the pressure in the wellbore is sufficiently increased by the pumping of the hydraulic fracturing unit on the surface, hydraulic fractures may be created within the hydrocarbon reservoir. Proppants, such as grains of sand or ceramic beads, may be provided with the pressurized hydraulic fracturing fluid, which may lodge into the hydraulically created fractures to keep the fracture open when the treatment pressure is released. The proppant-supported fractures may provide high-conductivity flow channels with a large area of formation to enhance hydrocarbon extraction.

A variety of fluids have been developed to withstand the high pump rates, shear stresses, and high temperatures and pressures a fracturing fluid may be exposed to. In particular, hydraulic fracturing fluids may be aqueous-based gels, emulsions, or foams. In such hydraulic fracturing fluids, complex chemical mixtures having sufficient viscosity properties may be included to generate fracture geometry in the formation rock and transport solid proppants holding the fracture open. In this context, the viscosity of the hydraulic fracturing fluids may impact the fracture initiation, propagation, and resulting dimensions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of stimulating a hydrocarbon-bearing formation. The method includes generating a foamed fracturing fluid having a half-life of 150 to 300 min at 77° F. The foamed fracturing fluid comprises a fluorosurfactant, a nanoparticle, and a gas phase. The method includes then introducing the foamed fracturing fluid into a hydrocarbon-bearing formation under a pressure greater than the fracturing pressure of the hydrocarbon-bearing formation to generate fractures in the hydrocarbon-bearing formation.

In another aspect, embodiments disclosed herein relate to a method of stimulating a hydrocarbon-bearing formation. The method includes introducing a foaming fluid composition into the hydrocarbon-bearing formation under a pressure greater than the fracturing pressure of the hydrocarbon-bearing formation to generate fractures in the hydrocarbon-bearing formation. The foamed fracturing fluid composition comprises a fluorosurfactant, a nanoparticle, and a gas phase. The method includes then generating a foam from the foaming composition inside the hydrocarbon-bearing formation. The foamed fracturing fluid has a half-life of 150 to 300 min at 77° F.

Other aspects and advantages of the claimed subject matter will be apparent from the following description and the appended claims.

DETAILED DESCRIPTION

Figure 1:
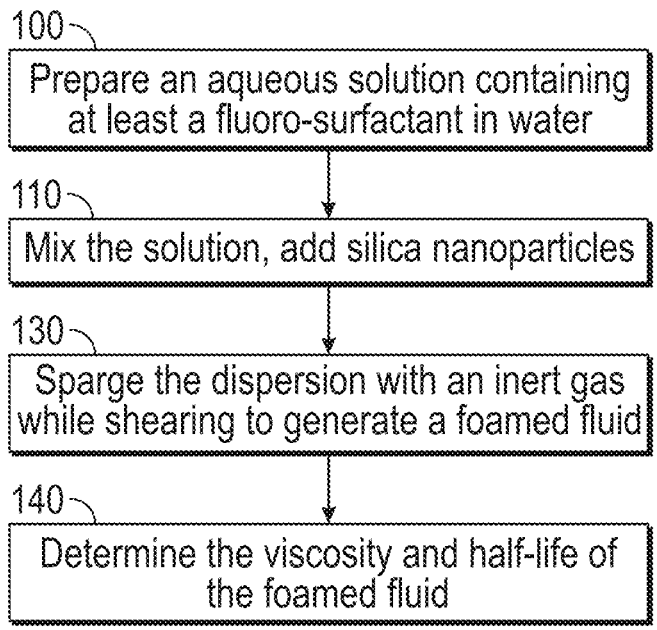
FIG. 1 is a block flow diagram of a method for preparing a foamed fracturing fluid comprising a fluorosurfactant in accordance with one or more embodiments.

Embodiments in accordance with the present disclosure generally relate to a method of making foamed fracturing fluid formulations and methods of treating a hydrocarbon-bearing formation using these foamed fracturing fluids. Fracturing fluids in accordance with the present disclosure comprise a fluorine-containing surfactant (also referred to herein as a fluorosurfactant), and nanoparticles that may exhibit increased fluid viscosity, coherent foam-film, and high stability properties for fracturing applications. The nanoparticles with fluorosurfactant foamed fluid may exhibit viscoelastic behavior under formation conditions. The present disclosure generally relates to a method of generating a fluorosurfactant-based foamed fracturing fluid and a method for stimulating a hydrocarbon-bearing formation by introducing the fluorosurfactant foamed fracturing fluid into the hydrocarbon-bearing formation under a pressure greater than the fracturing pressure of the formation to generate fractures in the formation.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In one or more embodiments, the foamed fracturing fluid composition includes a fluorosurfactant, nanoparticles, an inert gas, and a base fluid. In some embodiments, the foamed fracturing fluid may further include a proppant.

Methods according to one or more embodiments may involve injecting the foamed fracturing fluids into a hydrocarbon-bearing formation, such that the foamed fracturing fluids transport a proppant into fractures of the hydrocarbon-bearing formation. The foamed fracturing fluids may have a lower viscosity than conventional fracturing fluids. Conventional fracturing fluids that are based on aqueous solutions may increase in viscosity under downhole conditions making them difficult to recover, whereas the foamed fracturing fluids of the present disclosure may decrease in viscosity under downhole conditions. When a foamed fracturing fluid contacts a hydrocarbon in a reservoir, its viscosity may drastically decrease, enabling easy flow back of the fluid during production. The foamed fracturing fluids may demonstrate increased stability under high temperature and pressure conditions, making them highly suitable for use in downhole environments. As the foamed fracturing fluid used in the present disclosure contains a biodegradable surfactant and nanoscale solid particulates, it generally does not cause damage to the formation due to effective flow back and lack of residual deposition inside the formation.

Definitions

The term "wellbore" refers to a hole drilled into the surface of the earth. Wellbores are usually drilled in order to penetrate a reservoir that contains hydrocarbons, and such hydrocarbons may be recovered by extraction through a wellbore. A wellbore is also known as a borehole and may be cased with cement and/or steel to increase formation stability.

The term "fracturing" refers to an oil and gas well development process. The process usually involves several steps including injecting water, sand, and other chemicals under high pressure into a hydrocarbon-bearing formation through a wellbore. This process is intended to create new fractures in the rock as well as increase the size, extent, and connectivity of existing fractures. Fracturing is also known as hydraulic fracturing and fracking. It is used commonly in low-permeability rocks like tight sandstone, shale, and some coal beds to increase oil and/or gas flow to a well from petroleum-bearing rock formations and to create improved permeability in underground geothermal reservoirs.

The term "fracturing fluid" means a chemical mixture that is used in fracturing operations to increase the quantity of hydrocarbons that can be extracted. In such fracturing fluids, complex chemical mixtures having sufficient viscosity properties may be included to generate fracture geometry in the formation rock and transport solid proppants holding the fracture open. In this context, the viscosity of the hydraulic fracturing fluids may impact the fracture initiation, propagation, and resulting dimensions. Fracturing fluids may also contain proppants such as sand ("frac sand") or ceramic beads to hold open fractures created in the formation.

The term "foam" refers to an emulsion of a dispersed gas phase in a continuous liquid phase-stabilized using a surfactant or a foaming agent. In the present disclosure, nitrogen gas ($N_2$) and carbon dioxide ($CO_2$) are commonly used as gas phases while water-based fluid is used as liquid phase.

The term "foam quality" refers to a ratio of gas volume to foam volume (gas+liquid) at a certain pressure and temperature.

The term "nanoparticle" is defined as a particle where at least one dimension of the particle (i.e., the length, width, or height) is less than one micron.

The term "thermal stability" means the ability of a fluid to maintain its chemical and physical characteristics, meaning its ability to resist chemical reactions or changes in the physical state under heat. For instance, a compound with greater stability has more resistance to decomposition at high temperatures.

Foamed Fracturing Fluid Composition

One or more embodiments of the present disclosure relate to a foamed fracturing fluid composition. One of the main challenges for fracturing applications is the lack of thermal stability of foam at a high temperature. Foam bubbles tend to collapse because of foam's lamellae thinning, liquid drainage, and inter-bubble gas diffusion. Foams can be stabilized by lowering the permeability of gas components through foam film.

This can be achieved by increasing the quantity of adsorbed surfactant at the foam film by adding synergic agents or by reducing the contact area at the gas-liquid phase using nanoparticles in the foam composition. Nanoparticles, being solid and chemically robust, can stabilize foam under harsh conditions such as high temperature and salinity. Thus, the foamed fracturing fluids disclosed herein may contain a fluorosurfactant, nanoparticles, a gas, and a base fluid. The foamed fracturing fluids disclosed herein may be particularly useful because they may require significantly less water when compared to conventional fracturing fluids.

Fluorosurfactants are chemical compounds composed of two parts, polar hydrophilic head, and highly hydrophobic fluorocarbon tail. Fluorocarbons have outstanding physiochemical properties determined by the unique properties of fluorine. The specific properties of fluorocarbon chains (F-chains) can be summarized as follows. Fluorine has a larger size than hydrogen, it is more electronegative, but has lower polarizability and high ionization potential. Consequently, fluorocarbon chains are bulkier than those of hydrocarbons according to the mean volumes of $CF_2$ and $CF_3$ groups. F-chains are more rigid and often have helical configurations. The C—F bond is very strong and chemically stable, therefore, the fluorosurfactants have a high chemical and thermal stability.

Because of the low polarizability of fluorine, the van der Waals interactions between fluorinated chains are weak, resulting in low cohesive energy of fluorocarbons and therefore low dielectric constant, high vapor pressure, high compressibility, high gas solubility, low surface tension, high surface activity in aqueous solutions and low critical micelle concentration (CMC). The hydrophobicity of fluorocarbon chains is so high that they have a unique property being both hydrophobic and oleophobic, i.e., they are surface-active not only in aqueous but also in hydrocarbon solutions. Thus, fluorosurfactants may be particularly suitable for the foamed fracturing fluids disclosed herein.

In one or more embodiments, the foamed fracturing fluid composition includes at least one fluorosurfactant. The fluorosurfactant may be a surfactant having a molecular structure as shown in Formula (I):

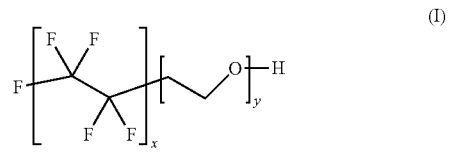

where x is an integer from 0 to 25, and y is an integer from 1 to 9.

In one or more embodiments, the fluorosurfactant may be an ethoxylated, nonionic, fluorosurfactant having a chemical structure as shown in Formula (II).

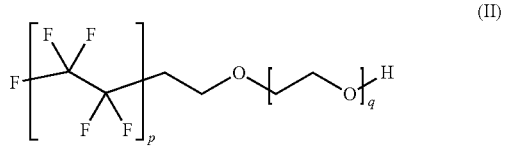

where p is an integer from 0 to 25, and q is an integer from 1 to 9. An example of a commercially available fluorosurfactant is the Zonyl® FSO fluorosurfactant available from Sigma Aldrich.

In one or more embodiments, the fluorosurfactant may be a quaternary ammonium chloride-based, cationic fluorosurfactant having the formula $CF_3$—$(CF_2)_n$—$(CH_2)_2$ $SCH_2CHOH$—$CH_2$—$N^+$ $CH_3$ $CH_3$ $CH_3Cl^-$ where: n is 5-9. An example of a commercially available version of such a cationic fluorosurfactant is ZONYL® FSD, described as 2-hydroxy-3-((gamma-omega-perfluoro-C6-20-alkyl)thio)-N, N, N-trimethyl-1-propyl ammonium chloride). The fluorosurfactant disclosed herein may be a water-soluble nonionic surfactant. The structure is a fluorinated or partially fluorinated organic compound (FOC) that is based on alcohol substituted glycol in its composition. The structure of the surfactant may include a fluorocarbon chain and oligo (ethylene oxide) chains. Linear or branched fluoroalkyls may be used to form partially fluorinated alcohol/glycols such as fluorinated polyethylene glycol, polypropylene glycol, methoxy polyethylene glycols, polyoxymethylene glycol, and polyoxyalene glycol. In one or more embodiments, the fluorosurfactant provides additional advantages along with foaming including excellent corrosion inhibition to metal surfaces at very low concentrations.

In one or more embodiments, the fluorosurfactant may be thermally stable at a temperature of 250° F. or more, 300° F. or more, 350° F. or more, or 375° F. or more, as measured by thermogravimetric analysis (TGA). The TGA measurement method as used herein measures the change in the weight of a specimen with a change in the temperature, and the thermal stability is calculated based on the weight loss and the heat transfer rate of the material.

In one or more embodiments, the fluorosurfactant may be highly soluble in aqueous solutions, such as in deionized water, seawater, brines, calcium chloride solutions, and the like, and also highly soluble in oils. In some embodiments, the fluorosurfactant may be soluble in both aqueous solutions and oils in an amount of 10% by weight (wt. %) or more, 20 wt. % or more, 30 wt. % or more, or 40 wt. % or more at ambient temperature. In some embodiments, the solubility of the fluorosurfactant may increase with increasing temperature.

In one or more embodiments, the fluorosurfactant may be present in the foamed fracturing fluid composition in an amount of about 0.1% to 5% by weight based on the total weight of the foamed fracturing fluid. The amount of the fluorosurfactant may have a lower limit of any one of 0.1, 0.2, 0.5, 0.7, 1, 1.5, 1.8, 2, 2.5, 3, and 4% by weight based on the total weight of the foamed fracturing fluid, and an upper limit of any one of 0.7, 1, 1.5, 1.8, 2, 2.5, 3, 4, and 5% by weight based on the total weight of the foamed fracturing fluid, where any lower limit may be paired with an upper limit.

In one or more embodiments, the foamed fracturing fluid composition may include a nanoparticle. In one or more embodiments, the nanoparticle may be a silica nanoparticle. In one or more embodiments, the silica nanoparticles may be surface modified. A wide variety of nanoparticles known to one skilled in the art may be used, including oxide nanoparticles, such as ZnO. Surface-modified nanoparticles may include surface-modifying agents with different functional groups such as amine ($NH_2$), carboxylate (COOH), octadecyl (C-18), poly(ethylene glycol) (PEG), 3-aminopropyltriethoxysilane (APTES), PP/(ethylene-octene) copolymer, (EOC) polymer blends, and co-hydrolysis with tetraethylorthosilicate (TEOS). An example of a commercially available silica suitable for one or more embodiments of the present disclosure is AEROSIL 200 (Evonik Industries, Germany). Additionally, in one or more embodiments, graphene or graphene oxide nanoparticles may be used as the nanoparticle of the disclosed composition. Nanoparticles may work as excellent stabilizers for gas-liquid foams such as the foams described herein. Due to their high surface energy, nanoparticles may have surface-active properties making them suitable for bridging two non-interacting chemicals. For foams, such stabilizing nanoparticles may act as a bridge between dispersed gas bubbles in a continuous liquid phase and form a solid barrier at the interface between the gas bubbles and the continuous liquid phase. The inclusion of nanoparticles in the disclosed foams, therefore, improves the stability of gas bubbles in a liquid phase and results in a stable foamed fluid.

The foamed fracturing fluids of one or more embodiments may comprise the silica nanoparticles in an amount of the range of about 1 to 10% by weight of the foam (wt %). For example, the foamed fracturing fluid may contain the surface-modified silica nanoparticles in an amount ranging from a lower limit of any of 1, 2, 5, 7, and 9 wt % to an upper limit of any of 5, 7, 9, and 10 wt %, where any lower limit can be used in combination with any mathematically-compatible upper limit.

The silica nanoparticle may have any suitable particle size for stabilizing foams. For example, in one or more embodiments, the silica nanoparticles may have an average particle size ranging from about 10 nm to 100 nm. For example, the average particle size of the silica nanoparticle may have a lower limit of any one of 10, 20, 30, 40, 50, 60, 70, 80, and 90, and an upper limit of any one of 20, 30, 40, 50, 60, 70, 80, 90 and 100, where any lower limit may be paired with any mathematically compatible upper limit. As will be appreciated by those skilled in the art, the nanoparticles as provided may have a distribution of particle sizes, which may be monodisperse or polydisperse.

The foamed fracturing fluids of one or more embodiments may include a base fluid. In one or more embodiments, the base fluid may be a water-based fracturing fluid. The fracturing fluids may be an acid stimulation fluid or an enhanced oil recovery (EOR) fluid, among others.

In one or more embodiments, the water-based fracturing fluid may comprise an aqueous fluid. The aqueous fluid may include at least one of freshwater, seawater, brine, water-soluble organic compounds, and mixtures thereof. The aqueous fluid may contain freshwater formulated to contain various salts. The salts may include but are not limited to, alkali metal halides and hydroxides. In one or more embodiments, the aqueous fluid may be a brine that may be any of seawater, aqueous solutions wherein the salt concentration is less than that of seawater, or aqueous solutions wherein the salt concentration are greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In one or more embodiments, the quality of water as the aqueous fluid may not significantly reduce foam stability. The rate of foam drainage may depend on multiple factors including temperature, the viscosity of the liquid phase, and the fluorosurfactant concentration.

In one or more embodiments, the foamability of the fracturing fluid may be dependent on the salinity of the aqueous fluid. The addition of salts in the fracturing fluid composition may alter the critical micelle concentration (CMC) of surfactants, and therefore, may change the behavior of the fracturing fluid composition. As used herein, CMC refers to the concentration of the surfactant above which micelles form, and all additional surfactants added to the system will form micelles. The addition of salts may influence the aqueous surfactant solution by modifying the intra-micellar and inter-micellar interactions, and therefore, may affect the phase behavior of foam. In one or more embodiments, the foamability of the fracturing fluid at a high salinity system may be dependent on the surfactant concentration. The foamability of the fracturing fluid may be insensitive to the surfactant concentration at a high surfactant concentration. For a non-limiting example, the foamability of the fracturing fluid may be insensitive to the surfactant concentration when the surfactant concentration is at least 0.025 wt. %. At a low surfactant concentration of less than 0.025 wt. %, foam stability of the fracturing fluid composition may be affected by the salinity of the fluid.

In one or more embodiments, the fracturing fluid may optionally include a polymer selected from the group consisting of guar, derivatized guar, polyacrylamide, polymers having carboxylate groups such as sulfonated polyacrylamide, high- or low-molecular-weight (MW) hydrolyzed polyacrylamides (HPAM), polyacrylates, polyethyleneimine, copolymers, terpolymers, crosslinked 2-Acrylamido-2-methylpropane sulfonic acid (AMPS), N-Vinylpyrrolidone (NVP), acrylamide/acrylate copolymers and terpolymers, amphoteric polymers and terpolymers, and hydrophobic ally modified poly[2-(dimethylamino)ethyl methacrylate] (pD-MAEMA).

In one or more embodiments, the foamed fracturing fluids may also include one or more acids. Acids may be included when the fracturing fluid is to be used in a matrix stimulation process, as described below. The acid may be any suitable acid known to a person of ordinary skill in the art, and its selection may be determined by the intended application of the fluid. In some embodiments, the acid may be one or more selected from the group consisting of hydrochloric acid and carboxylic acids such as acetic acid and hydrofluoric acid. In some embodiments, the acid may be sulfonic acids or their derivatives such as MSA (methanesulfonic acid).

In one or more embodiments, the foamed fracturing fluids may also include one or more chelating agents. Non-limiting examples of such chelating agents may be diethylenetriamene pentaacetate (DTPA), ethylenediaminetetraacetic acid (EDTA), tetrasodium glutamate diacetate (GLDA), and their derivatives.

The foamed fracturing fluid of one or more embodiments may comprise one or more acids in a total amount of the range of about 0.5 to 30 wt. % based on the total weight of the foamed fracturing fluid.

The foamed fracturing fluids of one or more embodiments may include one or more additives. The additives may be any conventionally known and one of ordinary skill in the art will, with the benefit of this disclosure, appreciate that the selection of said additives will be dependent upon the intended application of the fracturing fluid. In some embodiments, the additives may be one or more selected from clay stabilizers, scale inhibitors, corrosion inhibitors, biocides, friction reducers, thickeners, fluid loss additives, and the like. In one or more embodiments, the carrier fluid may contain additives conventionally used in various oil and gas operations such as wellbore drilling, oil and gas extraction, and acid treatment. Such additives may include, but are not limited to, corrosion inhibitors, friction reducers, non-emulsification agents, anti-sludging agents, pH-adjusting agents, pH-buffers, oxidizing agents, enzymes, lost circulation materials, scale inhibitors, surfactants, clay stabilizers, paraffin inhibitors, asphaltene inhibitors, penetrating agents, clay control additives, reducers, oxygen scavengers, emulsifiers, foamers, gases, derivatives thereof, thickeners, viscosity modifiers, lubricants, shale inhibitors, gelling agents, crosslinkers, deflocculants, a hydrogen sulfide, scavenger, iron control agent, mutual solvent, and combinations thereof.

The foamed fracturing fluid of one or more embodiments may comprise one or more additives in a total amount of the range of about 1 gallon per 1000 gallons to 100 gallons per 1000 gallons.

As noted above, foamed fracturing fluids described herein include a gas. The foamed fracturing fluid composition may be prepared by flowing gas into a liquid solution. The liquid solution includes the components as described above. The inert gas may be nitrogen gas ($N_2$) or carbon dioxide gas ($CO_2$). In some instances, air may be used for generating foams in a fracturing fluid composition.

The gas flow rate, time of flowing gas, and amount of gas needed to generate foam in a fluid may depend on the environment such as temperature and pressure, fluid properties including but not limited to the fluid density, viscosity, and present solid particles. Nitrogen gas may be particularly suitable for generating foam due to its chemical inertness and relative abundance.

The volume of a foamed fluid vs the volume of the fluid prior to generating the foam may determine the effectiveness of gas in forming a foam. If insufficient gas is included in a fracturing fluid formulation, the gas bubbles in the fluid may be spherical and may not be in contact with each other. In such instances, the viscosity of the foamed fluid may be low as gas bubbles in a foamed fluid are responsible for creating a resistance in the free fluid flow. If enough gas is included in a fracturing fluid formulation, the volume of gas bubbles present in the foamed fracturing fluid may be large, and therefore, the foam quality may be considered high. In such foamed fracturing fluids, the gas bubbles may be in contact with each other and therefore, lose spherical shapes. This enhanced resistivity in fluid flow may cause the viscosity of the foamed fluid to increase.

In one or more embodiments, the foamed fracturing fluid may comprise the fracturing fluid solution and the gas of 30 to 90% by volume, where the volume ratio is given as the volume of the gas-free liquid fracturing fluid solution to the volume of the gas occupied in a foamed fracturing fluid. For example, the foamed fracturing fluid may contain the gas and the liquid fracturing fluid in a volume ratio ranging from a lower limit of any of 30, 35, 40, 45, 50, 55, 60, 65, 70, 75, and 80% by volume to an upper limit of any of 40, 45, 50, 55, 60, 65, 70, 75, 80, 85, and 90% by volume, where any lower limit can be used in combination with any mathematically-compatible upper limit.

The foamed fracturing fluids may be used alone to fracture the formation. Alternatively, they may be used with a sufficient quantity of a proppant. Such proppants may include gravel, sand, bauxite, or glass beads. Proppants may be uncoated or coated with resins such as epoxy, furan, novolak, polyepoxide resins, furan/furfuryl alcohol resins, phenolic resins, urea-aldehyde resins, urethane resins, phenolic/latex resins, phenol-formaldehyde resins, polyester resins and acrylate resins, and copolymers and mixtures thereof. The particle size of the proppants may be from about 2 to about 400 mesh U.S. Sieve Series.

Properties of the Foamed Fluid

In one or more embodiments, the foamed fracturing fluid may have a density of from 0.9 to 1.5 g/cm³.

Foam quality under certain pressure and temperatures may be determined by measuring the ratio between gas volume and the total foam volume including gas and liquid phases. Form quality may be used as an important factor in determining foam stability and viscosity. As used herein, foam quality (F) as defined above is the ratio of gas volume to gas/liquid volume over a given temperature and pressure, and may be determined using Equation (I) below:

$$\Gamma = \frac{100 V_g}{V_g + V_l} \quad (1) \quad (I)$$

where $V_g$ is the gas volume and $V_l$ is the liquid volume.

In foams that have a foam quality below about 30%, gas bubbles do not generally come in contact with each other. These foams have low foam viscosity and include a large volume of free liquid. Foam qualities ranging from 30% to 90% indicate a foam in which gas bubbles are in contact with each other, resulting in an increased foam viscosity. In one or more embodiments, foams of the present disclosure may have a foam quality ranging from 30% to 90%. For example, the foam quality of disclosed foams may have a value range having a lower limit of one of 30, 35, 40, 45, 50, 55, 60, and 65% and an upper limit of one of 60, 65, 70, 75, 80, 85 and 90%, where any lower limit may be paired with any mathematically compatible upper limit.

Foam viscosity is another key parameter in determining the effectiveness for use in the methods disclosed herein. Foam viscosity may be determined as follows. A mixture of liquid and gas is circulated through a helically coiled loop in a foam rheometer and the differential pressure across the coil is used to measure foam viscosity. Foam viscosity may be measured at different shear rates, as will be indicated for specific viscosity measurements.

In one or more embodiments, a foamed fracturing fluid 0.15 to 0.30 wt % of silica nanoparticles with 1 wt % fluorosurfactant may have a viscosity range from 25 to 225 cP (centipoise) at 77° F. at a 1500 psi, shear rates range from 50 to 1300 1/s and 70% N₂ quality. Unless indicated otherwise, all viscosity values are obtained by using an HPHT Foam Rheometer system (Chandler Engineering, Model: 8500-3K). For example, the foamed fracturing fluid composition may have a viscosity at 77° F. at a shear rate of 1300 1/s, ranging from a lower limit of any of 25, 50, 75, 100, 125, 150, 175, and 200 cP to an upper limit of any of 75, 100, 125, 150, 175, 200, and 225 cP, where any lower limit can be used in combination with any mathematically-compatible upper limit. In some embodiments, the fracturing fluids may have a viscosity at 77° F. at a shear rate of 1300 1/s of 25 cP or more, 50 cP or more, 75 cP or more, 100 cP or more, 125 cP or more, 1500 cP, or more, 175 cP or more, or 200 or more.

In one or more embodiments, a foamed fracturing fluid composition comprising silica nanoparticles with fluorosurfactant may show improved rheological behavior under the elevated concentration of silica nanoparticles. For example, a foamed fracturing fluid composition comprising 0.15 to 0.30 wt % of silica nanoparticles with 1 wt % fluorosurfactant may exhibit an apparent viscosity of at least 50 cP in a shear rate ranging from 250 to 775 1/s. For example, the foamed fracturing fluid composition may show an apparent viscosity ranging from a lower limit of any of 50, 60, 70, 80, 90, and 100 cP to an upper limit of any of 70, 80, 90, and 100 cP, where any lower limit can be used in combination with any mathematically compatible upper limit.

In one or more embodiments, a foamed fracturing fluid comprising silica nanoparticles with fluorosurfactant may have almost twice the half-life time than the half-life time of a foamed fracturing fluid comprising the same quantity of fluorosurfactant, and no silica nanoparticles. In one or more embodiments, a foamed fracturing fluid comprising silica nanoparticles with fluorosurfactant may have a half-life of 300 to 18 minutes (min) at a temperature range from 77 to 200° F., whereas a foamed fracturing fluid comprising a fluorosurfactant and no silica nanoparticles may have a half-life of 160 to 7 min at a temperature range from 77 to 200° F.

At a constant temperature of 77° F., the foamed fracturing fluid composition comprising 1 wt % fluorosurfactant with 0-0.1 wt % nanoparticles may have a half-life ranging from 160 to 300 min, ranging from a lower limit of any of 160, 170, 180, 190, 200, 210, 220, 230, 240, 250, 260, 270, and 280 min to an upper limit of any of 180, 190, 200, 210, 220, 230, 240, 250, 260, 270, 280, 290, and 300 min, where any lower limit can be used in combination with any mathematically compatible upper limit.

At a constant temperature of 200° F., the foamed fracturing fluid composition comprising 1 wt % fluorosurfactant with 0-0.1 wt % nanoparticles may have a half-life ranging from 7 to 18 min, ranging from a lower limit of any of 7, 8, 9, 10, 11, 12, 13, 14, 15, and 16 min to an upper limit of any of 9, 10, 11, 12, 13, 14, 15, 16, 17 and 18 min, where any lower limit can be used in combination with any mathematically compatible upper limit.

Preparation of Foamed Fracturing Fluids

A method of preparing a foamed fracturing fluid of one or more embodiments is depicted by FIG. 1. All components and quantities discussed in relation to said method correspond to those discussed previously. In one or more embodiments, an aqueous solution containing a fluorosurfactant may be prepared in step 100. The aqueous solution may be made by any suitable mixing method known in the art with amounts as described previously. Next, in step 110 silica nanoparticles may be added and the solution mixed to form a dispersion of silica nanoparticles in the aqueous surfactant solution. Then, the dispersion is sparged with an inert gas while shear mixing generates a foamed fluid in step 130. A foamed fluid may be generated by passing gas into the mixture while shearing the mixture under a certain shear rate. As gas bubbles form inside the fluid mixture, the fluorosurfactant helps generate foam, and the nanoparticles provide stability to the foams under a range of temperature and pressure. Finally, the viscosity and half-life of foams may optionally be determined in step 140.

The foamed fracturing fluids may also be prepared by first making an aqueous fluorosurfactant solution, then generating a fluorosurfactant foam by passing gas in the surfactant solution at a certain shear rate, and then adding silica nanoparticles to the foamed surfactant solution. Continuous shearing at a certain rate may ensure well distribution of nanoparticles in the foamed mixture.

Furthermore, the foamed fracturing fluids may also be prepared by adding a fluorosurfactant solution to a mixture of silica nanoparticles while being sheared at a certain rate and passing gas into the mixture simultaneously. Thus, the components of the fracturing fluid may be added in any order. Standard mixing techniques may be used.

Method of Fracturing or Stimulating a Well Using Foamed Fracturing Fluids

Figure 2A:
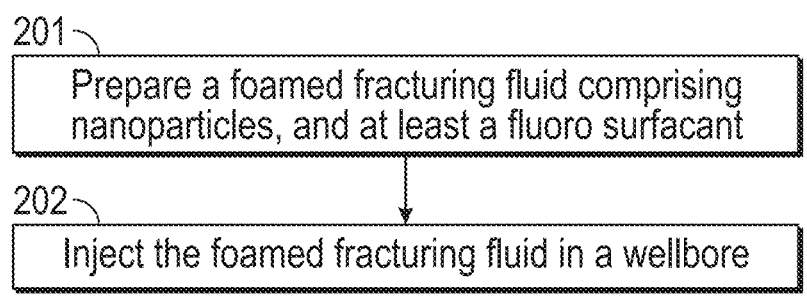
FIGS. 2A and 2B are block flow diagrams of methods for stimulating a wellbore using a foamed fracturing fluid in accordance with one or more embodiments.
Figure 2B:
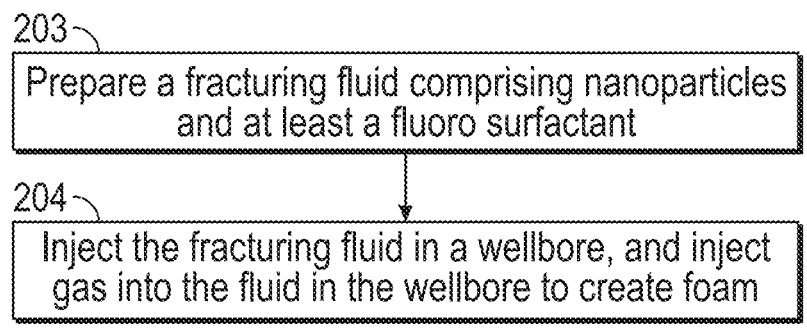

A method of stimulating a wellbore using a foamed fracturing fluid of one or more embodiments is depicted in FIGS. 2A and 2B. A foamed fracturing fluid may be prepared prior to injecting into a wellbore in step 201 as described above. Then, the foamed fracturing fluid may be injected into the wellbore in step 202. In one or more embodiments, a liquid fracturing fluid formulation may be prepared by mixing methods known in the art in step 203. The liquid formulation may contain all components of the fracturing foam except for the gas. Then the liquid formulation may be injected into the wellbore followed by the injection of the gaseous phase into the wellbore in step 204. In such embodiments, the foam may be generated in-situ in the wellbore.

A formation may be fractured by using the foamed fracturing fluids according to one or more embodiments. The foamed fracturing fluid may be injected into the wellbore at a pressure that may overcome the native overburden pressure of the formation, thus resulting in fracturing. The well may first be treated with a salt solution to help stabilize the formation prior to injection of the foamed fracturing fluids.

Methods in accordance with the present disclosure may include the injection of a foamed fracturing fluid into a formation. In one or more embodiments, the foamed fracturing fluid may be a single treatment fluid that is injected into the wellbore in one pumping stage. In other embodiments, methods in accordance with one or more embodiments may involve the injection of the foamed fracturing fluid and one or more additional stimulation fluids. The additional stimulation fluids may, in some embodiments, be co-injected with the foamed fracturing fluid. In some embodiments, the stimulation fluids may be injected after the foamed fracturing fluid.

The methods of one or more embodiments of the present disclosure may further comprise a pre-flushing step before the injection of the foamed fracturing fluid. The pre-flushing step may comprise flushing the formation with a flushing solution that comprises one or more surfactants. The flushing solution may be an aqueous solution, and the surfactant may be the same fluorosurfactant as included in the foamed fracturing fluid. The pre-flushing may limit the adsorption of the surfactants on the rock surface of the formation during the injection process. The suitability of the use of a pre-flushing step may depend on the type of surfactant and rock.

The hydrocarbon-containing formation of one or more embodiments may be a formation containing multiple zones of varying permeability. For instance, the formation may contain at least a zone having a relatively higher permeability and a zone having a relatively lower permeability. During conventional injection, fluids preferentially sweep the higher permeability zone, leaving the lower permeability zone incompletely swept. In one or more embodiments, the increased viscosity of the foamed fracturing fluid may "plug" the higher permeability zone, allowing subsequent fluid to sweep the low permeability zone and improving sweep efficiency.

The methods of one or more embodiments may be used for well stimulation. A well stimulation process in accordance with one or more embodiments of the present disclosure may include the step of injecting the foamed fracturing fluid into a hydrocarbon-bearing formation at an injection well. In some embodiments, the injection of the foamed fracturing fluid may be performed at a pressure that is below the fracturing pressure of the formation. A zone within the formation may be at a high temperature and increase the viscosity of the foamed fracturing fluid. After the increase in viscosity, the tail-end of the fluid is diverted to lower-permeability zones of the formation, displacing hydrocarbons. This results from the increase in viscosity that may "plug" the more permeable zones of the formation. The formation may be stimulated by the foamed fracturing fluid, creating pathways for hydrocarbon production. According to some embodiments, the displaced hydrocarbons may be recovered through the stimulated reservoir. In one or more embodiments, the hydrocarbons may be recovered at a production well.

The well stimulation process of one or more embodiments may be a matrix stimulation process. In the matrix stimulation process of one or more embodiments, the foamed fracturing fluid, or one of the stimulation fluids, may or may not contain acid. The acid fluid may react with the formation, dissolving rock, and creating wormholes that create a pathway for hydrocarbons to be displaced from deeper within the rock. In one or more embodiments, the foamed fracturing fluid may have a high viscosity in the formation, enabling the fluid to better penetrate lower-permeability zones of the formation and allowing the acid to more uniformly react with the entire formation, and eventually drop in viscosity. This may provide for the formation of deeper wormholes and enhance the overall permeability of the near-wellbore region. In the absence of this initial high viscosity, the fluid will primarily penetrate the high permeability zones.

In one or more embodiments, the well stimulation process may be repeated one or more times to increase the amount of hydrocarbons recovered. In some embodiments, subsequent well stimulation processes may involve the use of different amounts of the surfactant and/or different surfactants than the first. The methods of one or more embodiments may advantageously provide improved sweep efficiency.

Embodiments disclosed herein may be useful when applied to unconventional reservoirs. Unconventional reservoirs may be defined as those formations wherein hydrocarbon recovery is not economically possible without the implementation of specialized stimulation treatments such as matrix acidizing or fracturing. Unconventional reservoirs such as shale gas, tight sands, heavy oil, and tar sands are some examples of formations that need specialized stimulation for hydrocarbon production.

Although the embodiments disclosed herein focus on accessing unconventional reservoirs, the following embodiments and disclosure can be applied to any formations that would be receptive to the methods and systems disclosed.

In one or more embodiments, local conditions of the reservoir may include elevated temperature, elevated pressure, acidic conditions, high salinity, and combinations thereof. As environmental conditions vary from the reservoir to reservoir, the foamed fracturing fluid particles may have suitable stability to withstand external stimuli in the reservoir. In such embodiments, the foam may be stable under the elevated temperature conditions in a range from 50° F. to 350° F., elevated salinity up to 200,000 ppm total dissolved solids, and a pH range from about 4 to 8. In addition, the foamed fracturing fluid may be stable in a time frame of several hours to several days.

Embodiments disclosed herein may be useful over a wide range of downhole conditions, including temperatures of up to about 350° F., such as up to about 325° F., up to about 300° F., up to about 250° F., or up to about 200° F. In one or more embodiments, the formation may have a temperature ranging from about 50 to 350° F. For example, the formation may have a temperature that is of an amount ranging from a lower limit of any of 50, 60, 70, 80, 90, 100, 150, 200, 250, and 300° F. to an upper limit of any of 100, 150, 200, 250, 300, and 350° F., where any lower limit can be used in combination with any mathematically-compatible upper limit.

Downhole pressures may be from about 50 pounds per square inch (psi) (0.345 megapascals (MPa)) to about 30,000 psi (206 MPa), such as from about 100 psi (0.689 MPa) to about 30,000 psi, from about 1,000 psi (6.90 MPa) to about 30,000 psi, from about 50 psi to about 20,000 psi (138 MPa), from about 100 psi to about 20,000 psi (68.9 MPa), from about 1,000 psi to about 20,000 psi, from about 50 psi to about 10,000 psi, from about 100 psi to about 20,000 psi, or from about 1,000 psi to about 10,000 psi.

A person of ordinary skill in the art will appreciate, with the benefit of this disclosure, that the physical properties of a wellbore treatment fluid are important in determining the suitability of the fluid for a given application.

The following examples are merely illustrative and should not be interpreted as limiting the scope of the present disclosure.

EXAMPLES

Materials

A fluorosurfactant having a fluorinated or partially organic compound (FOC) in the structure was utilized for producing foamed fracturing fluid compositions. The fluorosurfactant is Zonyl® FSN-100 having a CAS #65545-80-4 and a chemical structure of $(C_2H_4O)_n(CF_2)$—$C_2H_5FO$. The surfactant was obtained from Sprint Oil and Gas Services company.

A high purity, low moisture content fumed silica grade was used as the filler for the examples. Silica nanoparticles having the commercial name AEROSIL 200 were supplied by Evonik Industries, Germany. The average diameter of the nanoparticles was 12 to 50 nm. The used silica nanoparticles were surface modified. To modify the surface, the silica nanoparticles were functionalized in a liquid phase (toluene) using 3-aminopropyltriethoxysilane (APTES) as a modifying agent (Sigma-Aldrich, purity 99%). Nitrogen gas was used for generating foam in the fluorosurfactant-nanoparticles mixture.

A foam loop rheometer was utilized to investigate the effect of dynamic conditions on foam's stability and rheological properties. Several tests were conducted at share rates of 300 $S^{-1}$, 275-350° F., 1500 psi, and 70% $N_2$ quality using an HP/HT foam rheometer system (Chandler Engineering, Model: 8500-3K). The working mechanism of the instrument is as following: a Coriolis flowmeter provided mass flow measurement of the sample. The differential pressure between the tube's two ends was measured using DP transducers (high and low ranges). The shear rate and stress of the fluid flow through the pipe were calculated using Equation 2-3. The $N_2$ quality was calculated from obtained liquid and gas mixture mass measurements. A high-resolution optical microscope was used to observe the morphological structure of foams during dynamic testing assessed with view cell and light bulb.

$$\text{Shear Rate } (\gamma), s^{-1} = \frac{8 \times \text{Velocity}}{\text{Tube } ID} \quad \text{Eq. 2}$$

$$\text{Shear Stress } (\tau), lb_f/ft^2 = \frac{\text{Tube } ID \times \text{Differntial Pressure}}{4 \times \text{Tube Length}} \quad \text{Eq. 3}$$

Preparation of Foam Fluid

The silica nanoparticles/fluorosurfactant foam was prepared by mixing different concentrations of silica nanoparticles (0-2 wt %) and different concentrations of surfactant (1-2 wt %) in 100 ml of DI water. The fluorosurfactant was initially diluted to 48-52 wt % in water for use. The fluorosurfactant solution was added gradually to the silica nanoparticles dispersions to reduce aggregation during the preparation process. The mixture was stirred overnight at 1500 rpm mixing speed to ensure a homogeneous mixture of particles in the fluid.

The "waring blender" method was used to prepare samples. Specifically, a waring blender was used to stir 100 ml of dispersion that included 2.0 wt % of silica nanoparticles and 2.0 wt % fluorosurfactant for 5 minutes at a high shear rate using a blender (Torrington Conn., 06790).

To test the performance of the foamed fluid composition, 40 ml of the prepared foamed fluid was then transferred to a sealed cylinder to record the foam decaying time (measuring foam height with time) up to 200° F. using an oven at atmospheric pressure. The composition of tested foamed fracturing fluid samples comprising a fluorosurfactant and silica nanoparticles are shown in Table 1 below:

TABLE 1

| | Composition of Samples tested | |
|---|---|---|
| Test Sample | silica nanoparticles concentration | fluorosurfactant concentration |
| Sample 1 | 0 wt % | 1 wt % |
| Sample 2 | 0 wt % | 2 wt % |
| Sample 3 | 2 wt % | 2 wt % |
| Sample 4 | 0.15 wt % | 1 wt % |
| Sample 5 | 0.3 wt % | 1 wt % |

Example 1: Foam Characterization Test Results

In the conventional foam fracturing process, first foam is generated on the surface and then is injected into a well formation. The temperature of the foamed fracturing fluid increases with increasing the depth of the well and reaches the highest temperature under the target formation. Static foam stability may deteriorate at high temperatures due to thermal degradation, and therefore, may result in decreased efficiency of the foamed fracturing fluid. In order to predict the effectiveness of a foamed fracturing fluid, the half-life time of foamed fluid at different temperatures was tested. Static foam tests were used to evaluate the effects of introducing silica nanoparticles on the fluorosurfactant foam stability and rheological characteristics.

A foam loop rheometer was used to evaluate the dynamic rheology and stability of silica nanoparticles with fluorosurfactant foamed fluid. Samples 1, 4, and 5 from Table 1 were tested. The apparent viscosity and stability were measured by the HPHT Foam Rheometer system (Chandler Engineering, Model: 8500-3K) at 77-275-300° F., 1500 psi, and 70% Na quality. All tests were conducted under shear rates ranging from 50 to 1300 1/s.

A high-resolution optical microscope was used to observe the foam film morphological properties.

Example 2: Foam Stability Results

Figure 3:
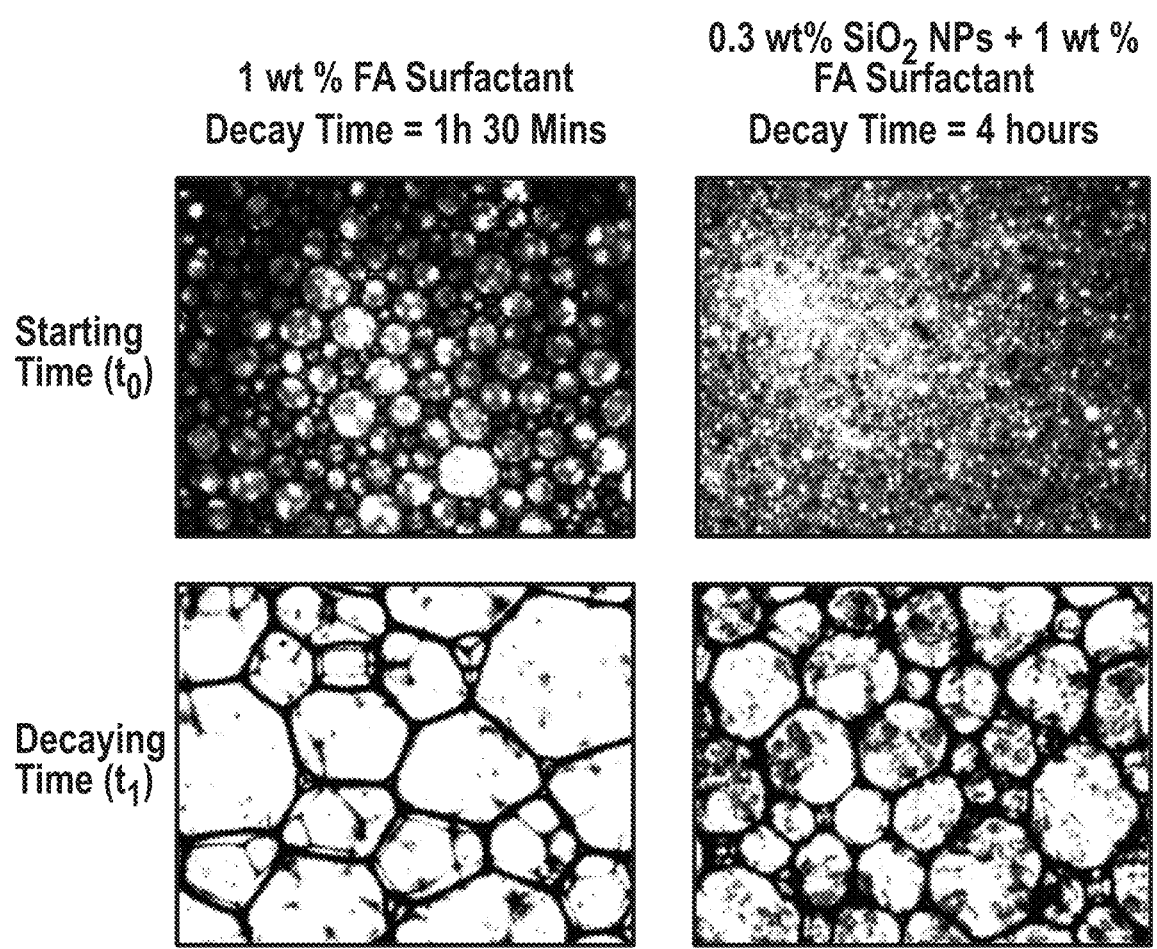
FIG. 3 shows microscopic images of foam films of a foamed fracturing fluid at 77° F. as a function of time in accordance with one or more embodiments.

The dynamic foam stability was studied from the change of the foam film morphology with time. FIG. 3 shows interfacial integrated heterostructures of foamed fracturing fluids according to one or more embodiments. The initial average size of silica nanoparticles fluorosurfactant foam bubbles was approximately 2.5% of the average size of foams generated by fluorosurfactant only. In addition, the silica nanoparticles fluorosurfactant foam bubbles kept a spherical shape while the fluorosurfactant only foam bubbles showed a hexagonal shape after about 60 min.

The interfacial integration mechanism of the silica nanoparticles fluorosurfactant foam bubbles may be based on combining two components at the nano/micro-level to create a barrier that held the foam film (lamella). Without wishing to be bound by any particular mechanism or theory, it is believed that silica nanoparticles and surfactant molecules may accumulate together to arrange one single layer between the foam film and the liquid phase which may increase the flow resistance of water between bubbles and slow the liquid drainage, as illustrated in FIG. 3. The fluorosurfactant may enhance the foam-viscosity by connecting its molecules to the silica nanoparticles, and thus may interrupt the destabilization mechanisms such as drainage of the liquid in the lamella film, coalescence of neighboring bubbles (lamella rupture), and Ostwald ripening. For example, the silica nanoparticles fluorosurfactant foam-film structure was stable for 240 min. The Silica nanoparticles were absorbed in the bubble surface and enhanced the capability of the film to resist deformation. The number of bubbles in the silica nanoparticles with fluorosurfactant foam was decreased slightly during the time measured. However, the foam film remained stable for about 240 min. Therefore, the overall effectiveness of the foamed fluid remained high for being utilized as a fracturing fluid.

Figure 4:
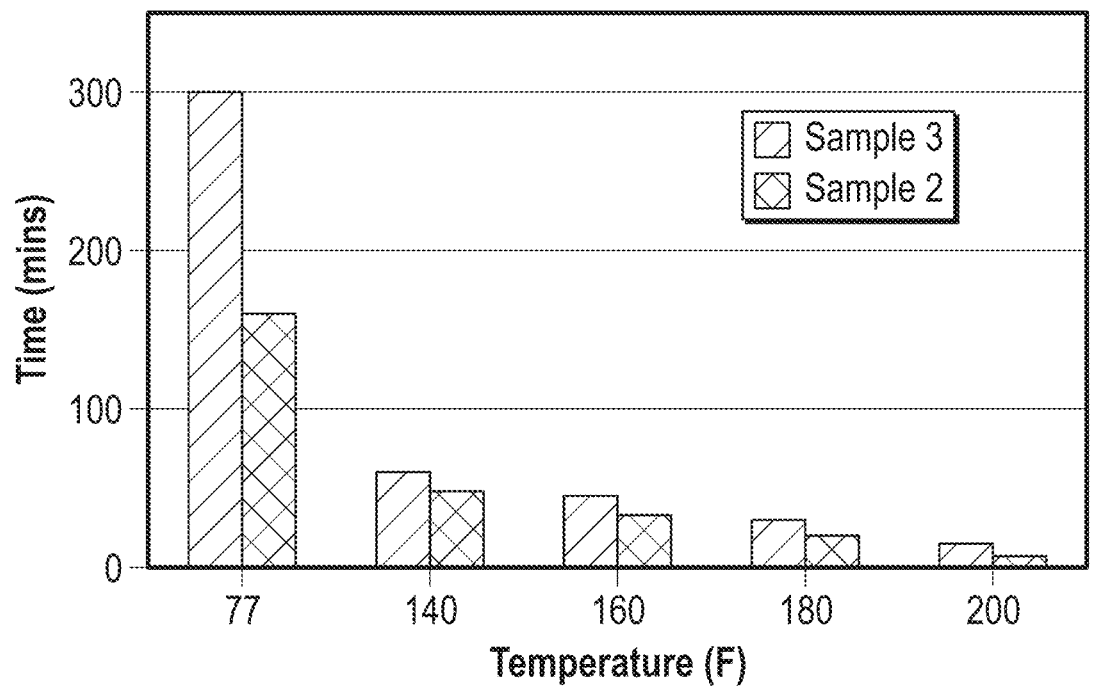
FIG. 4 is a graphical representation of the half-life of foamed fracturing fluid foams at different temperatures in accordance with one or more embodiments.

FIG. 4 shows the half-life of foamed fracturing fluids as a function of temperature. Samples 2, and 3 from Table 1 were tested. The half-life time of Sample 3 was approximately two times that of Sample 2. The half-life time of Sample 3 was 300 min whereas the half-life time of Sample 2 was 160 min at 77° F. However, at a higher temperature of 140° F., half-life times were reduced to 60 and 48 minutes for Sample 3 and Sample 2, respectively. The thermal stability of foamed fluids at 200° F. for Sample 3 and Sample 2 were 15 and 7 minutes, respectively, as illustrated in FIG. 4. Sample 3 exhibited a significant enhancement in the thermal stability, from 40 to 80% higher half-life times compared to Sample 2.

Table 2 shows thermal stability test results of the half-life of silica nanoparticles with fluorosurfactant foam at different silica nanoparticles concentrations.

TABLE 2

Half-Life Data

| Sample | Half-Life at Various Testing Temperatures | | | | |
|---|---|---|---|---|---|
|  | 77° F. | 140° F. | 160° F. | 180° F. | 200° F. |
| 1 wt % surfactant with 0 wt % NPs | 300 min | 60 min | 50 min | 30 min | 18 min |
| 1 wt % surfactant with 0.1 wt % NPs | 160 min | 46 min | 40 min | 18 min | 7 min |

Example 3: Foam Viscosity Results

Figure 5:
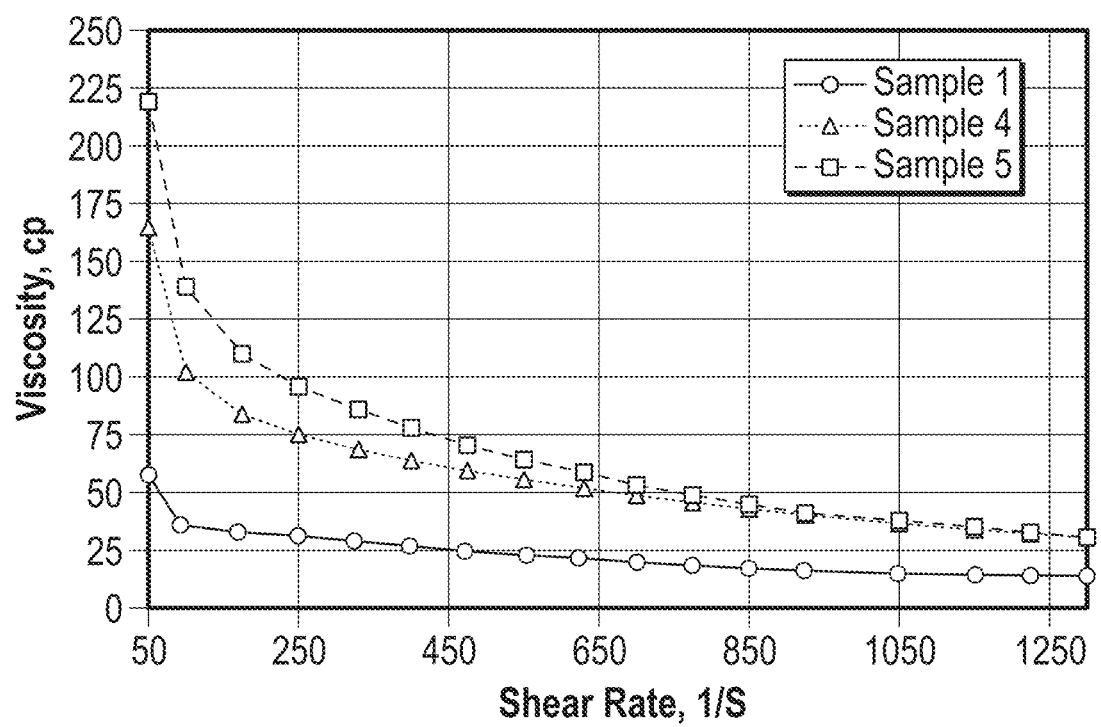
FIG. 5 is a graphical representation of the apparent viscosity of different foamed fluid compositions in accordance with one or more embodiments.

FIG. 5 shows the change in the apparent viscosity of Sample 1, Sample 4, and Sample 5 with time. The control Sample, Sample 1 contains 1 wt % of fluorosurfactant in the absence of any NP, the test samples—Sample 4 contains 0.15 wt % of silica nanoparticles with 1.0 wt % of fluorosurfactant, and sample 5 contains 0.30 wt % of silica nanoparticles with 1.0 wt % of fluorosurfactant. The foamed fluid compositions were tested under shear rates ranging from 50 to 1300 1/s at 77° F., 1500 psi, and 70% $N_2$ quality. The apparent foam viscosity of Sample 1 decreased gradually with increasing the shear rate and reached an apparent viscosity of 38 cP at 100 1/s. Both Sample 4 and Sample 5 showed approximately two times higher viscosity compared to Sample 1 at shear rates ranging from 50 to 250 1/s. Under higher shear rates ranging from 250 to 775 1/s, the apparent viscosity of Sample 4, and Sample 5 remained above 50 cP. For Sample 4, the maximum apparent viscosity was 102 at 100 1/s shear rate, whereas for Sample 5, the maximum apparent viscosity was 139 at 100 1/s shear rate. At higher share rates ranging from 775 to 1300 1/s, Sample 4 and Sample 5 demonstrated comparable viscosity where they remained above 48 cP. Both Sample 4 and Sample 5 remained stable for 300 minutes under the experimental conditions.

Embodiments of the present disclosure may provide at least one of the following advantages. The fracturing of tight and shale gas reservoirs has increased significantly in recent years, thus creating a huge demand for fracturing fluid with high performance and low formation damage. Conventionally, surfactants are used alone to stabilize the foam. Their stabilization mechanism relies on lying their molecules at the air-water interface to reduce the surface tension and prevent gaseous bubbles from coalescing. However, surfactant-stabilized foams may be unstable for a long time, especially under harsh conditions such as high temperature, high pressure, and high salinity. The heterostructures integration in foams may enhance foam stabilization by restricting drainage and creating a steric barrier to foam film. Interfacial integration of the foam components may increase the foam stability and viscosity more than the species alone. The foamed fracturing fluid comprising silica nanoparticles with fluorosurfactant foamed fluid may not require the addition of viscosifying agents or cross-linkers, or other additives to support the foam lamella film. Such foamed fluid compositions comprising silica nanoparticles with fluorosurfactant may exhibit adequate viscosity that is comparable to the cross-linked based foam-fluid. Also, comprising silica nanoparticles with fluorosurfactant foamed fluid may not create insoluble residue in the formation. Finally, the proppant transport ability of foamed fluid compositions comprising silica nanoparticles with fluorosurfactant may be comparable to the other traditional fluids that have been used in the hydraulic fracturing process.

Foamed fracturing fluids have several advantages over conventional stimulation fluids. In particular, they are suitable for stimulating depleted reservoirs and water-sensitive formations, and they provide a shortened flow back period. Moreover, freshwater consumption is significantly reduced due to the addition of gas, for example, nitrogen or carbon dioxide. Foamed fluids can be applicable in drilling, hydraulic fracturing, acidizing, artificial lifting, removing condensate banking, diverting fluids, enhanced oil recovery, steam-foams for heavy oil and bitumen recovery, etc. In fracturing applications, foamed fracturing fluid offers distinct advantages such as excellent proppant transport, solid free fluid loss control, minimum fluid retention due to low-water content of foam, compatibility with reservoir fluids, low hydrostatic pressure to returned fluids giving faster cleanup and gas in foam helps in returning liquids to the wellbore. In acid fracturing applications, foamed acid offers additional benefits such as retardation, deeper conductivity generation, reduced water consumption, and improved acid diversion.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Ranges may be expressed as from about one particular value to about another particular value, inclusive. When such a range is expressed, it is to be understood that another embodiment is from one particular value to the other particular value, along with all particular values and combinations thereof within the range.

While the disclosure includes a limited number of embodiments, those skilled in the art, having the benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of stimulating a hydrocarbon-bearing formation, the method comprising:

generating a foamed fracturing fluid from a fracturing fluid by sparging the fracturing fluid with a gas while shear mixing the fracturing fluid, wherein the fracturing fluid comprises:

a base fluid;

a fluorosurfactant; and a nanoparticle; and introducing the foamed fracturing fluid into a hydrocarbon-bearing formation under a pressure greater than a fracturing pressure of the hydrocarbon-bearing formation to generate fractures in the hydrocarbon-bearing formation, wherein the fluorosurfactant has a chemical structure represented by formula (I) or formula (II):

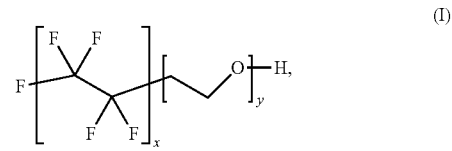

wherein x is an integer from 0 to 25, and y is an integer from 0 to 9; and

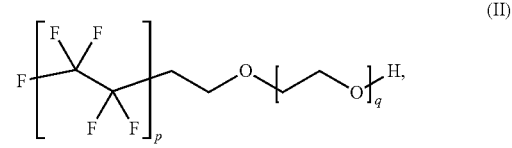

wherein p is an integer from 0 to 25, and q is an integer from 1 to 9.

2. The method of claim 1, wherein the nanoparticle is silica.

3. The method of claim 1, wherein the foamed fracturing fluid comprises from 0.1 to 5% by weight of the fluorosurfactant.

4. The method of claim 1, wherein the foamed fracturing fluid comprises from 0.1 to 10% by weight of the nanoparticle.

5. The method of claim 1, wherein the foamed fracturing fluid further comprises a polymer.

6. The method of claim 1, wherein the foamed fracturing fluid further comprises a proppant.

7. The method of claim 1, wherein the foamed fracturing fluid further comprises an acid.

8. The method of claim 1, wherein the foamed fracturing fluid has a viscosity of at least 25 cP at a temperature of 77° F.

9. A method of stimulating a hydrocarbon-bearing formation, the method comprising:

introducing a foaming composition into the hydrocarbon-bearing formation under a pressure greater than fracturing pressure of the hydrocarbon-bearing formation to generate fractures in the hydrocarbon-bearing formation, wherein the foaming composition comprises:
a base fluid;
a fluorosurfactant; and
a nanoparticle;
and
generating a foam from the foaming composition by injecting a gas into the hydrocarbon-bearing formation and flowing the gas through the foaming composition inside the hydrocarbon-bearing formation thereby generating a foam inside the hydrocarbon-bearing formation, wherein, the foam has a half-life of 160 to 300 min at 77° F.,
wherein the fluorosurfactant has a chemical structure represented by formula (I) or formula (II):

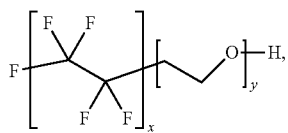
(I)

wherein x is an integer from 0 to 25, and y is an integer from 0 to 9; and

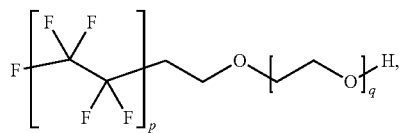
(II)

wherein p is an integer from 0 to 25, and q is an integer from 1 to 9.

10. The method of claim 9, wherein the nanoparticle is silica.

11. The method of claim 9, wherein the foam comprises from 0.1 to 5% by weight of the fluorosurfactant.

12. The method of claim 9, wherein the foam comprises from 0.1 to 10% by weight of the nanoparticle.

13. The method of claim 9, wherein the foaming composition further comprises a polymer.

14. The method of claim 9, wherein the foaming composition further comprises a proppant.

15. The method of claim 9, wherein the foaming composition further comprises an acid.

* * * * *